United States Patent
Randolph et al.

(10) Patent No.: US 6,739,855 B2
(45) Date of Patent: May 25, 2004

(54) EXTERNAL THICKNESS CONTROL AND METHOD

(75) Inventors: William Randolph, Farmington, NY (US); Robert E. Cree, Newark, NY (US)

(73) Assignee: Addex, Inc., Stoughton, MA (US)

( * ) Notice: Subject to any disclaimer, the term of this patent is extended or adjusted under 35 U.S.C. 154(b) by 316 days.

(21) Appl. No.: 09/809,698

(22) Filed: Mar. 15, 2001

(65) Prior Publication Data

US 2002/0130431 A1 Sep. 19, 2002

(51) Int. Cl.$^7$ ............................................. B29C 47/20
(52) U.S. Cl. .................. 425/72.1; 425/141; 425/326.1; 425/387.1
(58) Field of Search ................ 425/72.1, 141, 425/326.1, 387.1, 383

(56) References Cited

U.S. PATENT DOCUMENTS

| | | | |
|---|---|---|---|
| 3,507,006 A | 4/1970 | Princen | |
| 3,835,209 A | 9/1974 | Karabedian | 264/51 |
| 4,115,048 A | 9/1978 | Alderfer et al. | 425/72 R |
| 4,209,475 A * | 6/1980 | Herrington et al. | 425/326.1 |
| 4,955,802 A | 9/1990 | Halter et al. | 425/72.1 |
| 5,281,375 A | 1/1994 | Konermann | 264/40.3 |
| 5,310,329 A | 5/1994 | Cree | 425/72.1 |
| 5,322,431 A | 6/1994 | Kahlen et al. | 425/72.1 |
| 5,352,393 A | 10/1994 | Joseph | 264/23 |
| 5,468,134 A | 11/1995 | Cree | 425/72.1 |
| 5,562,926 A | 10/1996 | Karl | 425/72.1 |
| 5,676,893 A | 10/1997 | Cree | 264/40.1 |
| 5,683,727 A * | 11/1997 | Kahlen | 425/72.1 |
| 5,804,221 A * | 9/1998 | Planeta et al. | 425/72.1 |
| 5,891,383 A | 4/1999 | Joseph | 264/407 |
| 6,190,152 B1 | 2/2001 | Cree | 425/133.1 |

* cited by examiner

*Primary Examiner*—Robert Davis
*Assistant Examiner*—Joseph S. Del Sole
(74) *Attorney, Agent, or Firm*—Addex, Inc.

(57) ABSTRACT

A plastic resin extrusion line for the production of blown film includes an external thickness control device that provides a controllable amount of air from an inlet side through an annular region to one or two sets of lips. Barriers that can be manually or automatically controlled are provided in the annular region for localized control of air flow and thus for localized thickness control. The pressure drop across the barriers is significant relative to that in the lips.

27 Claims, 7 Drawing Sheets

EXTERNAL THICKNESS CONTROL AND METHOD

BACKGROUND OF THE INVENTION

The present invention relates to improving the quality of products produced by plastic resin extrusion lines and to the production of blown film.

When blown film is extruded, it typically is in the form of a continuous, vertically oriented tube. The tube, which is in a molten state as it exits a die, expands in diameter as it is pulled continuously upward. The diameter stabilizes to a more or less constant value when the tube cools sufficiently to solidify. This solidification occurs a short distance from the die at what is called the frost line. Air cooling systems such as air rings outside of the tube and internal bubble cooling (IBC) systems within the tube are provided close to the exit of the die to ensure that the tube cools quickly enough to remain stable.

After solidifying, the tube passes through stabilizers of various designs and into a flattening device, known as a collapsing frame, to convert the inflated tube into a flattened out film with no air inside. This film is pressed together by motorized nip rolls that continually draw the film upward and away from the extrusion process to form what is call "layflat." The die and nip roll act as seals, which in steady state, form a trapped, column of air with constant volume inside the tube.

As the film is extruded, thickness variations occur around the circumference of the bubble. It is recognized that these variations are caused by such factors as circumferential nonuniformity in flow distribution channels (ports and spirals) within the die, melt viscosity nonuniformity, and inconsistent annular die gaps through which the polymer exits the die. Additionally, variability of the cooling air and non-uniformity of air aspirated into the cooling air stream from the atmosphere surrounding the extrusion line are major contributors to film thickness variation.

Many film processors rely on conventional blown film equipment to determine the film thickness. This approach typically yields an average variation of +/-10%-20% in film thickness, overall. The presence of such thickness variations creates problems that limit the throughput of downstream conversion equipment, such as printing presses, laminators, or bag machines. In processes where the film is not converted in-line, but is wound onto a roll prior to converting, the thicker and thinner areas of many layers on the roll create hills and valleys on the roll surface, thus deforming the film and magnifying the subsequent converting problem.

A widely practiced method for controlling blown film thickness variation is the use of fans and barriers placed strategically around the process to correct for ambient air variability. This is usually done in combination with manual operator adjustment of the annular die gap through which the liquid polymer melt exits to help minimize the die gap and the effects of variation in the melt viscosity. The main problem with this approach is that the ambient conditions surrounding the process constantly change and require continuous monitoring and barrier and/or fan repositioning. This approach also does not take care of the relatively narrow thickness bands associated with the die ports and spirals, but does allow the processor to use the highest performance equipment available on the market to maximize throughput on the line.

Thickness improvement over such manual adjustments is found in current systems that actively measure the thickness of the film on-line. Employing closed loop control, these systems use computers to track thickness variations as they occur in the still-inflated bubble and to calculate corrections to individual control zones within the die or cooling systems. These zones impart localized thickness variations which are opposite to those measured and thus to some extent correct for thickness deviations circumferentially around the bubble, including to differing degrees those variations caused by the ports and spirals within the die. Many such systems presently in use require the use of control equipment which improves thickness control but at the expense of throughput rate. A problem associated with all automatic systems is the necessary complexity which creates high cost and requires the use of skilled operators and maintenance personnel.

One approach seeks to control blown film thickness variation by direct mechanical adjustment and deformation of the die lip. In these systems, localized, circumferentially variable, mechanical adjustments to the die lip cause detrimentally large hoop stress and elastic forces to develop in the die lip, thereby resisting deformation and spreading the effect of the adjustment over a larger area than that intended. These problems limit the effective resolution. These systems have correspondingly poor control over thickness variation but do not preclude the use of high performance cooling systems which maximize throughput rate.

Another approach utilizes direct, circumferentially variable, heating of the exit lip from the die. In these systems, individual heaters embedded in the die lip locally heat the lips. Since heat spreads outward in all directions through the steel, the effect is not as locally concentrated as desired and resolution is reduced. Also, heat that is added to the die lip transfers this heat to the molten polymer, thereby raising its local temperature. This extra heat must be removed by the cooling systems, forcing the throughput rate of film production to be lowered.

Yet another approach employs circumferentially variable heating of the cooling air which flows from the primary cooling ring surrounding the blown film bubble. Individual actuators control the local temperature of the cooling air and affect the thickness of the film. Due to the large volumes of air and associated turbulence involved, mixing occurs and significantly degrades the performance of this type of system. Also, heat that is added to the cooling air have the drawback of losing cooling capacity since overall temperature is raised, thus forcing the throughput rate of film production to be lowered.

A more commonly used approach alters in a circumferentially variable way, the flow of air exiting the primary cooling ring surrounding the exterior of the blown film bubble. Individual low pressure actuators mechanically alter the flow of cooling air through associated control zones by using an air blade to section off and bleed air out and away from the air ring which starve feeds the local air flow without causing appreciable pressure drop across the actuator as is described in U.S. Pat. No. 5,281,375. The thickness of the film is affected because more or less heat is removed due to the presence of more or less cooling air. Typically, single flow designs of air rings that use this approach produce acceptable thickness control capability, but have a drawback in that the reduced cooling capability lowers processing throughput rate.

Air blades more recently have been fitted to high performance dual lip air rings, such as those manufactured by Addex, Inc. Multiple radially oriented channels located within the plenum are used to evenly distribute and direct the air flow to the air blades where the low pressure drop air blades section off some of the air that is delivered to the lips the same as with a single flow air ring. This approach has a significant limitation in that there is limited control range capability and can only partially compensate for variations present on a typical blown film process. These systems suffer from the additional disadvantage of added complexity which adds significantly to cost and reduced resolution due to the size of the air blade actuators which limits the ability to control narrow thickness variations commonly present. These systems retain their high throughput capabilities.

A further approach controls in a circumferentially variable way the flow of air exiting the internal bubble cooling (IBC) ring contained within the blown film bubble. This approach does not affect bubble stability since the tube does not lock on the internal cooler and has excellent control of thickness variation. Further, it allows the use of any high performance cooling system exterior to the bubble that is desired and therefore allows for maximum throughput rate. One drawback, however, is that the system cannot be fitted to smaller die diameters, i.e., less than about 10 inches (250 mm), due to space constraints. Additionally, not all processors of film want to employ IBC systems within their process.

It is highly desirable to produce higher quality film during the extrusion process so that the downstream equipment can be run faster and produce better end use products with more consistent thickness while at the same time maximizing the throughput rate of the extrusion line through the use of high performance dual flow air rings and without size restrictions or the requirement to use IBC. It is further desirable to accomplish this using a simpler design to minimize cost and labor.

SUMMARY OF THE INVENTION

The present invention includes an external air ring thickness profile control system on a blown film extrusion line. The external thickness profiler of the present invention includes a simple to use and inexpensive manual actuation system as well as an automatic actuation system. Rather than trying to minimize pressure drop with an actuating zone, the system of the present invention employs a high pressure drop actuator which acts locally to alter air flow without affecting critical relative flows to lips where the air is provided to the blown film.

According to one embodiment of the present invention, air is provided through radial channels and then to the lips, in which case cross-sections at actuation points are varied in one or more channels to locally alter air flow such that there is a high pressure drop before reaching the lips. This drop allows the air flow to normalize within the channel after actuation and thus to develop into uniform pipe flow. Upon exiting the radially inward end of the multiple channels, the air flows are under semi-laminar flow conditions inwardly through the lip section, thus preventing appreciable mixing with air from other channels. After the actuator, the length of the radial channel should be of sufficient length, e.g., about 8 times the effective channel diameter or greater, to fully generate pipe flow and create the desired pressure drop. Shorter lengths channels would reduce the effect on local thickness. Further, it is preferred to deliver the air to the lips as soon as possible after it clears the radial channels so that the pressure drop in the lips does not become large compared to the pressure drop through the radial channels, a situation that would also serve to dilute the local effect on thickness.

Manually controllable barriers can be used as actuators to provide a low cost alternative to automatic control. These barriers can be provided as screws that are handled in a similar fashion to die adjustment bolts commonly used by operators when adjusting die lips for thickness optimization, or as blocks to block portions of an annular region between air inlet and lips. The thickness adjustment can be well pronounced and fine-tunable using procedures that are generally understood by operating personnel in other contexts. A further advantage is that the resolution attainable is high because there can be over 120 control zones even on very small processes and hoop stresses are not an issue.

Other embodiments add automatically controllable barriers, such as pistons, to allow for automatic closed loop control of thickness variation.

In a dual external ring, it is desirable to locate the actuator before the air flows separates to the two lips. About 10% of air flows to a lower lip, typically located outwardly concentric with an exit point of the molten tube from the die. The remaining 90% passes to a main lip located concentrically above and generally outward from the lower lip, as is readily know in present dual lip air rings. By actuating well before this lip section, semi-laminar flow air acts locally to divert at the same relative proportions to the lower and main lip and thus not affect bubble stability as long as a certain minimum air flow is present to develop Bernoulli forces strong enough to just "lock" the tube into the lips.

Other features and advantages will become apparent from the following detailed description, drawings, and claims.

DETAIL DESCRIPTION

Figure 1:
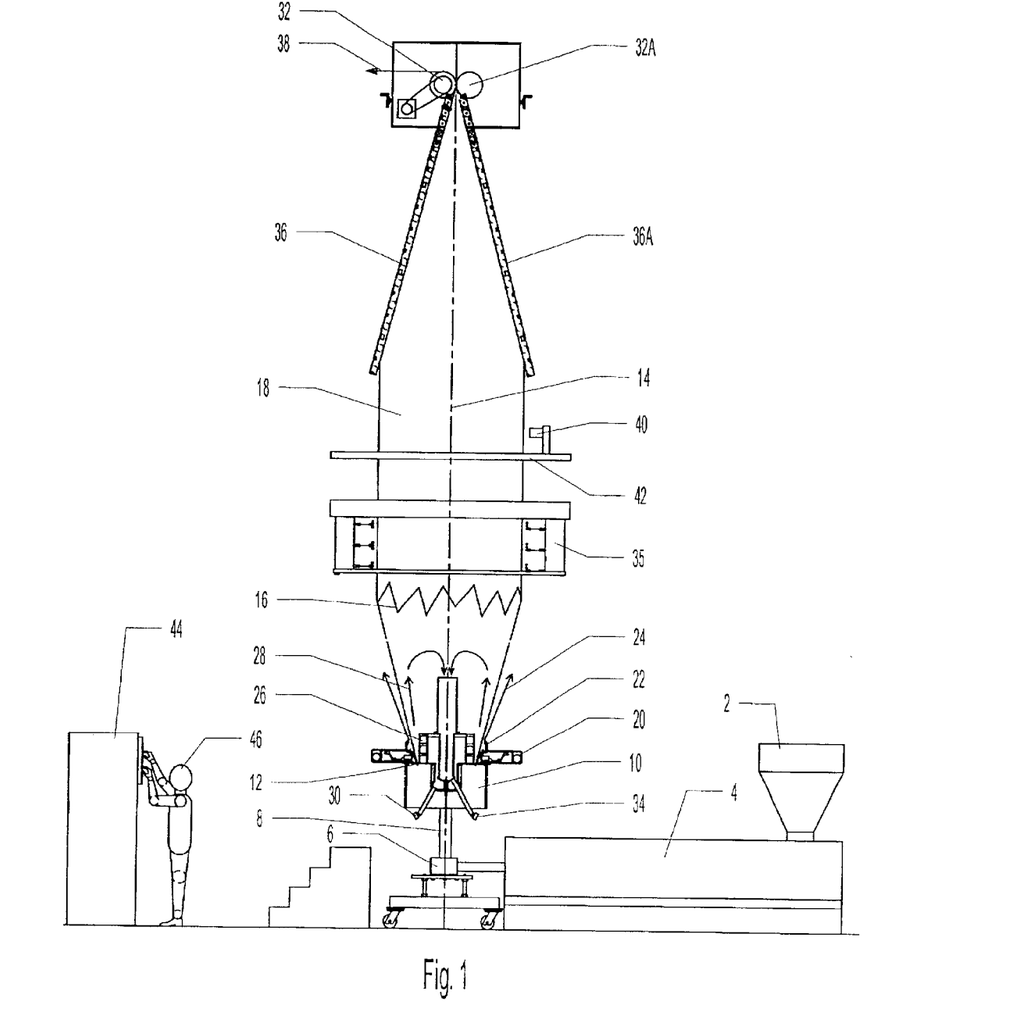
FIG. 1 is a schematic side view showing a blown film extrusion apparatus including an external thickness profiler according to the present invention.

FIG. 1 illustrates a known system for extrusion of molten plastic resin to form blown film. Plastic pellets are fed into a feed hopper 2 and transferred into an extruder 4 where the pellets are melted, mixed, and pressurized by the action of an extruder screw. The melt exits extruder 4 and is conveyed through a die block 6 where it is directed upwardly through a vertical neck 8 into the bottom of a blown film die 10. The plastic melt flow is designed to form an annular, cylindrical plastic melt flow 12 which is extruded from an annular orifice at the top of die 10. This annular melt flow is continually drawn away from die 10 in a manner generally concentric with a process centerline 14. The annular diameter of the cylindrical plastic melt flow 12 enlarges as it progresses from the die until it reaches a frost line 16 (indicated diagrammatically by a saw-tooth line) to form a cooled, solidified plastic tubular film bubble 18.

Primary cooling air for the process is supplied to an external thickness profiler 20 from an air source (not shown). External thickness profiler 20 functions as the primary cooling air ring for the process. The air is applied to contact the extruding plastic melt adjacent a base portion of the bubble by air ring lips 22. The air flows in circumferentially controlled annular air streams 24 along an outside expanding surface of the bubble.

Inside the bubble and concentric with centerline 14 is an internal bubble cooling (IBC) system 26. System 26 provides internal cooling air to contact an inside surface of the extruding plastic melt adjacent the base portion of the bubble and flows in annular air streams 28 along the inside expanding surface of the bubble. The plastic melt is cooled sufficiently to solidify into tubular bubble 18 at frost line 16.

Internal cooling air is provided through air passages 30 located in die 10 to IBC system 26. Bubble 18 is sealed at the top by nip rolls 32, 32a and at the bottom by die 10, and thus has a closed volume. To maintain a constant bubble volume, air is exhausted out of bubble 18 at the same rate that it is pumped in through air passages 34 located in die 10 according to known techniques, enabling the annular dimension of bubble 18 to remain constant.

Also, according to known techniques, tubular bubble 18 is continually drawn upward through stabilizer 35 and collapsing frames 36 and 36a where it is compressed into a flat sheet of film 38, also known as "layflat," as it passes through a nipping point between nip rolls 32 and 32a. These nip rolls are driven to continually pull the film through the extrusion process. Layflat film 38 is then converted and/or wound into finished product by downstream processing equipment.

Non-uniformities in the extrusion system, for instance non-uniformities in resin flow produced by the discrete flow passages commonly used in die 10, cause circumferential thickness variations in bubble 18. Thickness variations are measured by sensor 40, e.g., of the known capacitive or nuclear back-scatter types, which is scanned around the circumference of bubble 18 by circularly rotatable track 42. Thickness information and respective position information of the thickness sensor are continually provided to thickness monitoring console 44 which provides operator 46 with feedback of the magnitude and location of cicumferential thickness variations in bubble 18. In response to feedback from thickness monitoring console 44, operator 46 changes circumferentially controlled annular air streams 24 to achieve the desired thickness profile around the circumference of bubble 18.

Figure 2:
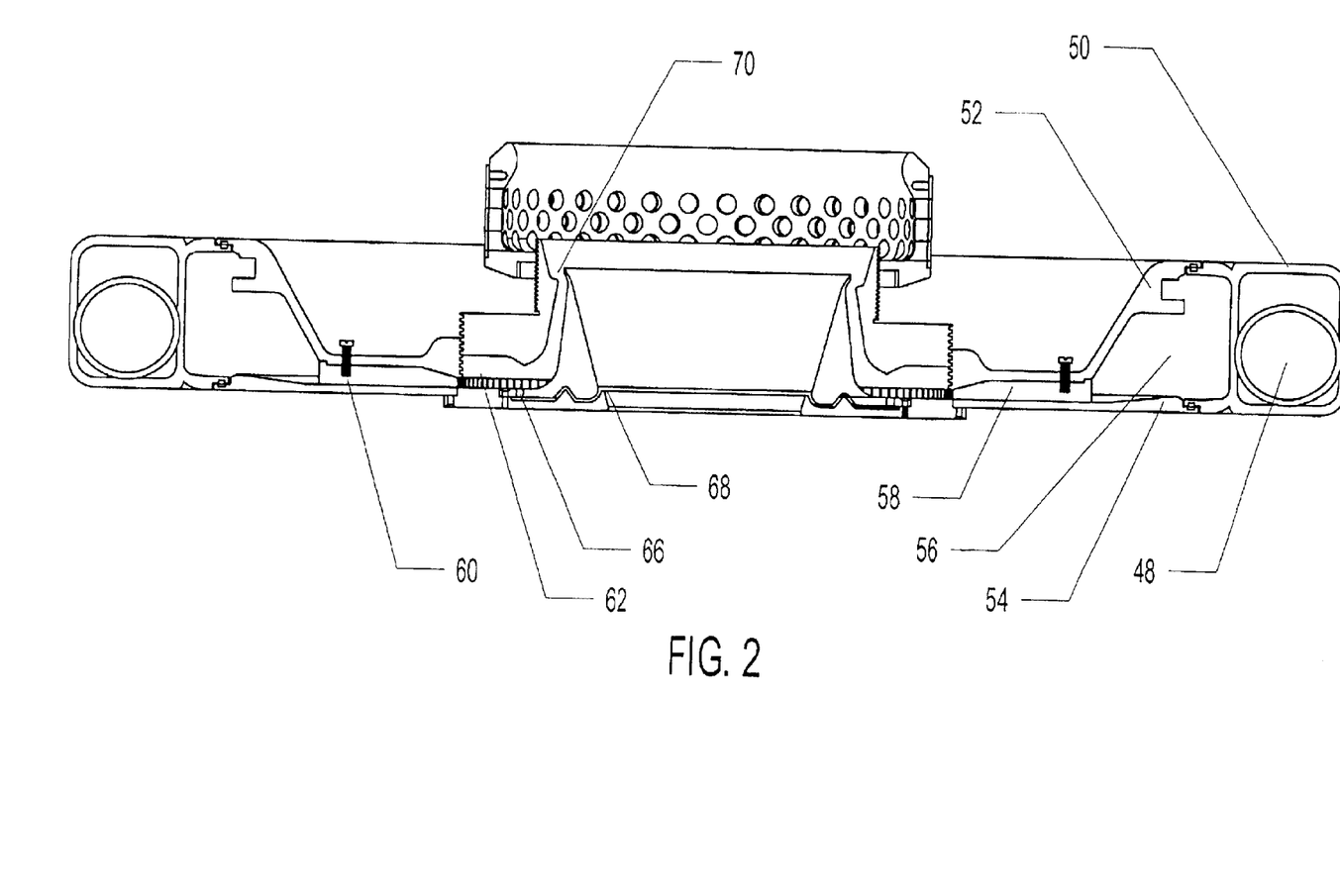
FIG. 2 is a schematic cross sectional view of the external thickness profiler of FIG. 1.
Figure 3:
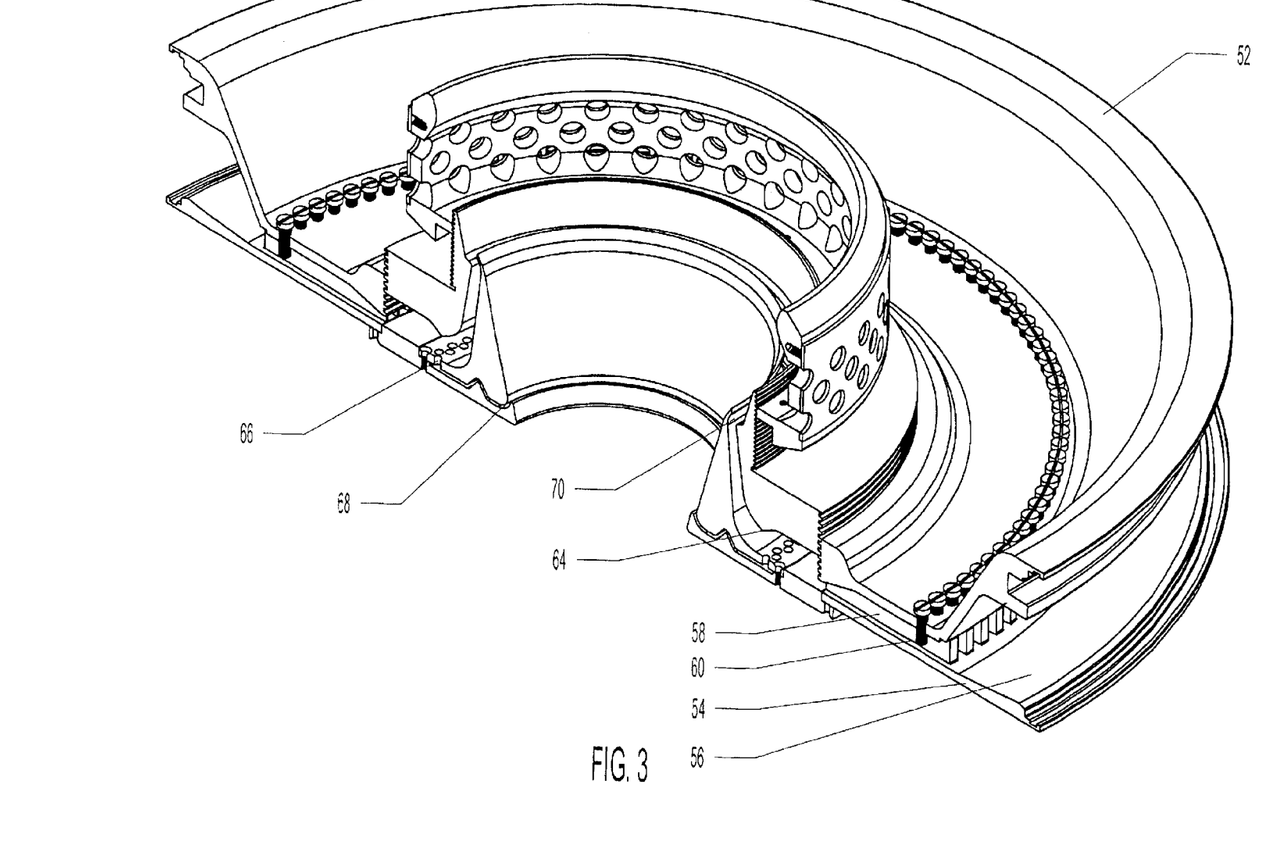
FIG. 3 is a perspective cross sectional view of the external thickness profiler without the outer plenum portion.

FIGS. 2 and 3 are schematic and perspective cross sectional views of the external thickness profiler 20 (FIG. 1) and the sets of air ring lips. Primary cooling air enters the external thickness profiler through multiple air inlets 48 formed integrally with an outer plenum 50. Air passes more or less tangentially from inlets 48 into annular plenum chamber 56 formed by outer plenum 50, top plenum wall 52 and bottom plenum wall 54. This structure is generally known. Multiple air inlets 48 extend partially along the circumference, and connect through large open passages (not shown) as part of plenum 56.

Figure 4:
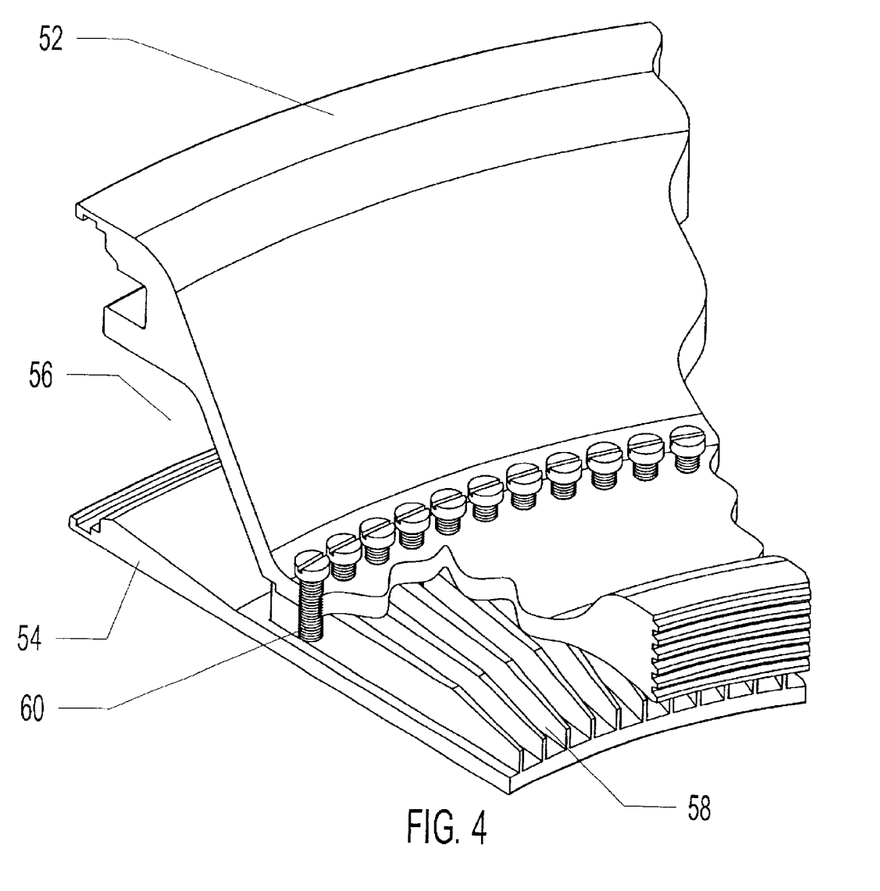
FIG. 4 is a partially cut away perspective view of the radial channels and actuator section of the manual thickness profiler of FIG. 3.

Referring also to FIG. 4, tangential air flow patterns are converted to radial air flow patterns by passing air into multiple radial channels 58 formed monolithically in bottom plenum wall 54 and enclosed by top plenum wall 52. Multiple radial channels 58 are arranged outwardly and circumferentially equally spaced around the air ring lips to provide air flow to the air ring lips. FIG. 2 shows a series of the inner radial ends of channels 58.

Local air flow through each radial channel 58 can be independently modified and controlled by using manually actuated barriers, shown here as screws 60, with one actuating screw 60 associated with each radial channel 58, thereby allowing for circumferentially variable air flow to be delivered to the air ring lips. Barriers could potentially be provided for only some of the channels.

Circumferentially variable air flow enters lip plenum 62. An air dam 64 (FIG. 3) deflects a portion of this air (about 10%) through a back-pressure generated by the air ring lips 22, through multiple lower lip feed holes 66 and directs this air to lower lip 68. Referring also to FIG. 1, lip 68 is coaxially spaced just outwardly of a base of cylindrical plastic melt flow 12 and typically just above die 10. This air begins to flow upwardly as part of circumferentially controlled annular air stream 24 along the outside of the expanding cylindrical plastic melt flow 12. Referring mainly to FIG. 3, a majority of the circumferentially variable air, typically about 90%, passes under air dam 64 and exits through main lip 70 where it rejoins air from lower lip 68. The balance of air flow exiting lower lip 68 and main lip 70 is critical to maintaining bubble stability.

Air exiting from main lip 70 forcefully acts due to Bernoulli forces on cylindrical plastic melt flow 12 to hold it closely spaced, about ¼ inch (6 mm) concentrically inward from main lip 70. The local flow volume of controlled annular air stream 24 must remain above a certain minimum, such as an equivalent to a flow that creates about two inches of water pressure drop through lips 22 under normal operating conditions; otherwise, insufficient holding force will be present and bubble 18 will become unstable.

Manual actuating screws 60 should be located in an air flow region of pressure drop large enough to be significant compared to the pressure drop of lips 22 and be constrained sufficiently to flow laminarly to minimize mixing effects which would act to erase the effects of circumferentially variable air flow. It has been found through experimentation that radial channels 58 account for slightly more pressure drop than the pressure drop from lips 22, making radial channels 58 a good location for manual actuating screws 60. Further, it is desirable that radial channels 58 are made to be at least 8 times longer than their effective diameter to generate semi-laminar pipe flow as is commonly understood within industry for air flow in a pipe. Manual actuating screws 60 are preferably placed at or near the inlet to radial channels 58 to allow radial channels 58 to be long after such flow regulation by manual actuating screws 60 to generate semi-laminar pipe flow and thus help prevent appreciable mixing effects when the air exits the radial channels. Unlike some devices in which a diverting blade is used to slice and divert a significant portion of air flow out and away from the air ring lips, in this embodiment, the air that is provided to the radial channels all goes to the lips without being diverted through exit slots or other intentional means.

The barriers can actually be placed anywhere along the radial channels provided that the pressure drop across these barriers is significant compared to the pressure drop across the lips such that back pressure and air mixing at the inner end of the radial channels are not significant. The desired relationship is for the pressure drop across the barriers to be 50% or more of the pressure drop across the lips and preferably at least equal to that pressure drop.

To allow desired control of the thickness at desired locations, a change in the barrier in one or more nearby radial channels should have a predictable effect at that same circumferential position in the bubble. It would be most desirable, for example, if control could be achieved such that a change over a 10% range of the radial channels would yield a change in just 10% of the resulting bubble, thus allowing fine control. There generally will be at least some side-to-side mixing of air as it exits the radial channels and some mixing due to back pressure from the lips. As long as the pressure drop is substantial compared to the lips, however, the attempt to localize the change will be reasonably effective; if the pressure drop is insignificant, however, back pressure will create significant mixing and churning and effectively wash out the effect of the change in the barriers in the radial channels.

Figure 5A:
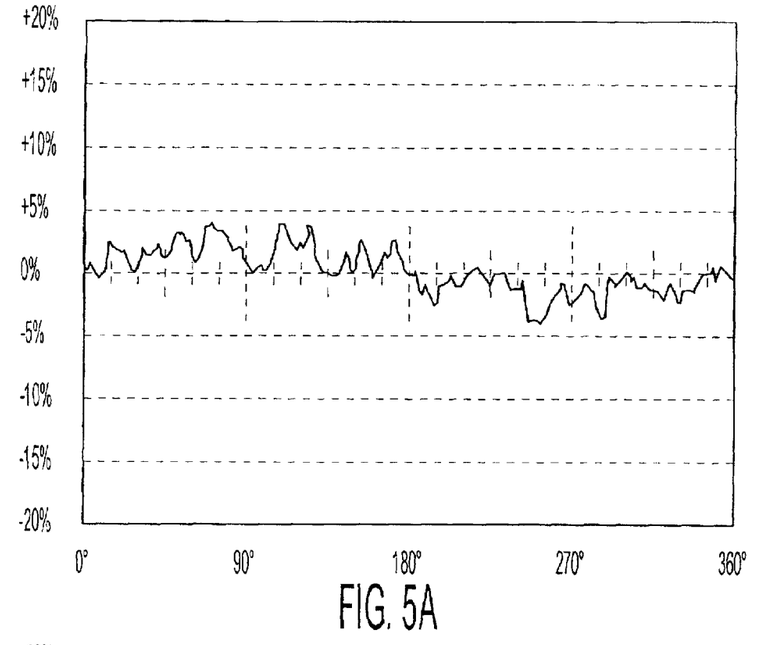
FIG. 5a is a graphical representation of the thickness profile resulting on a blown film extrusion line taken with the manual thickness profiler in the neutral position.
Figure 5B:
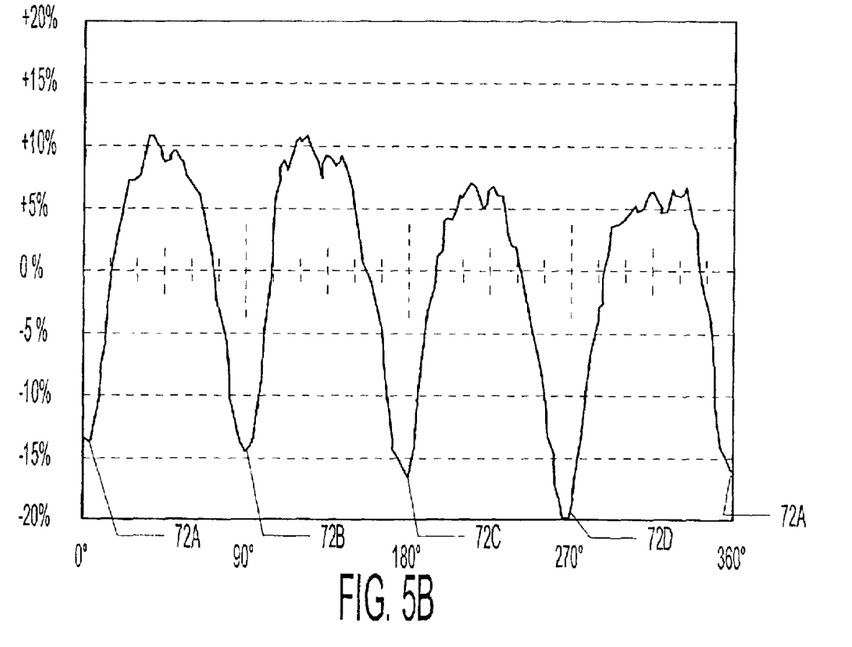
FIG. 5b is a graphical representation of the thickness profile resulting on a blown film extrusion line taken with the manual thickness profiler inducing thickness bands at four equally spaced positions.

FIGS. 5a and 5b together show the ability of external thickness profiler to affect the thickness profile around the circumference of bubble 18. FIG. 5a depicts an actual process producing 2 mil (50 micron) thick film with the resulting profile indicating a total thickness variation of about 8 to 10 percent for 0° to 360° around a circumference of bubble 18 with all manual actuating screws 60 being in a neutral 100% fully open position. The same process without changing any operating conditions is shown in FIG. 5b, this time with manual actuating screws 60 being repositioned to 20% open over a width of 25° at four equally space locations of 0°, 90°, 180°, and 360°. Thickness bands 72A, 72B, 72C, and 72D, are clearly evident with a width commensurate to the 25° spread of actuation and with total magnitude of about 25% of nominal thickness, which is 2½ to 3 times more than is required to offset the natural variation present in FIG. 5a. As overall film thickness varies, typical process variations as a percentage are magnified roughly inversely proportionally to the overall thickness; similarly, the response magnitude of thickness control varies as well. For example, a 1 mil (25 micron) film might exhibit 16% to 20% variation and the actuation response under similar conditions described above would be a magnitude of about 50% again, which is more than large enough to compensate.

Figure 6:
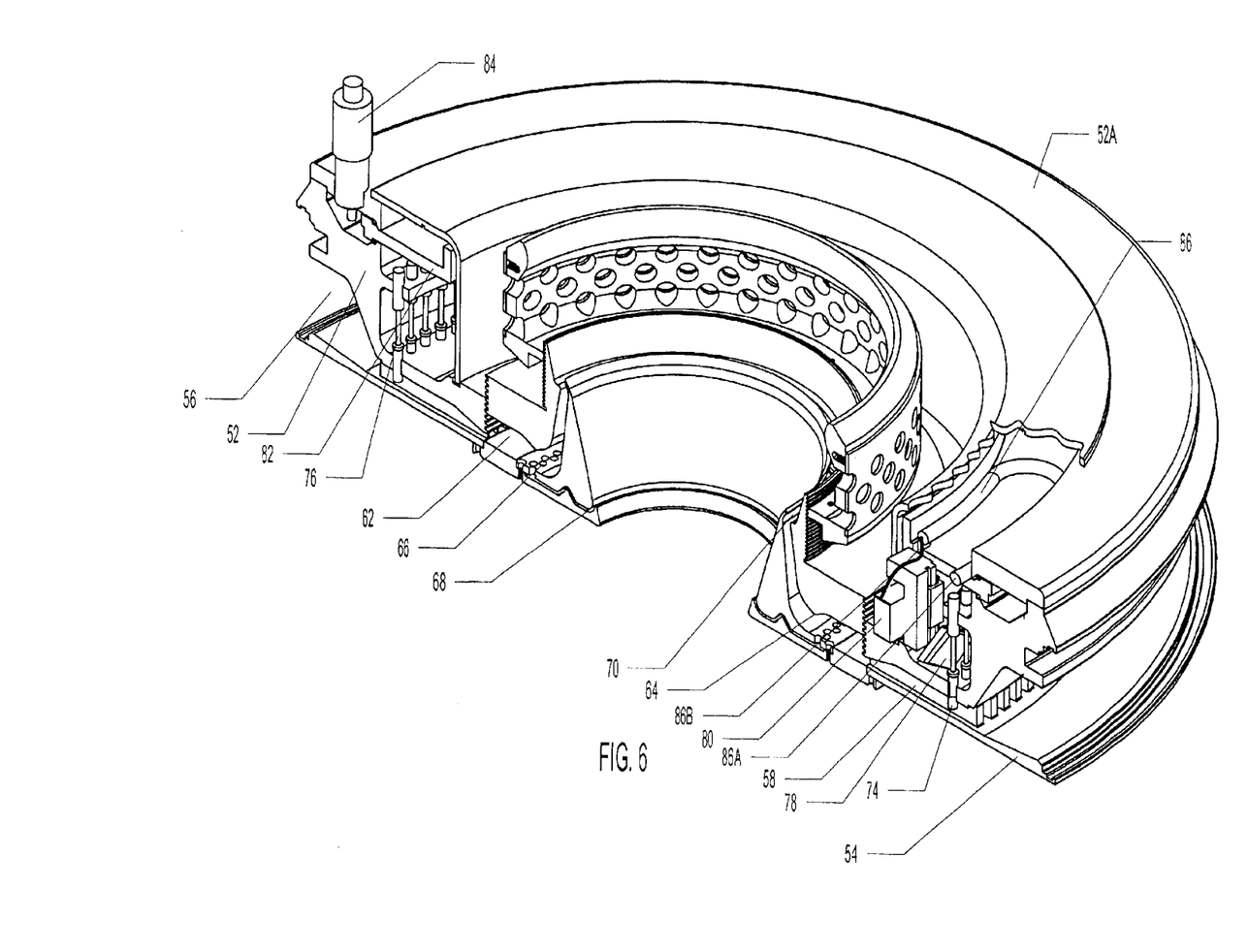
FIG. 6 is a cross sectional perspective view on an enlarged scale of the thickness profiler of the present invention incorporating automatic positioning of actuators.

FIG. 6 is a cross sectional perspective view of external thickness profiler 20 of the present invention incorporating automatic positioning of actuators. All components function the same as before except that manual actuating screws 60 are replaced by automatic actuator pistons. Automatic actuator pistons 74 are frictionally held in place by orings (not shown) in top plenum wall 52. Piston adjusting grooves 76 are cut into automatic actuator pistons 74 and aligned to allow a servo wedge 78, to fully engage. A servo positioner 80 vertically adjusts the position of servo wedge 78 which in turn locally adjusts one of the multiple automatic actuator pistons 74. Rotatable annular ring 82 is driven and positioned by motor 84 and is sandwiched using ball bearings between top plenum wall 52 and a top plenum clamping plate 52a to allow for rotation. Servo positioner 80 together with integral servo wedge 78 are attached to a rotatable annular ring 82 to allow for the positioning of servo wedge 78 to align with any one of the multiple automatic actuator pistons 74 located circumferentially within external thickness profiler 20, thereby allowing for individual adjustment of each automatic actuator piston 74 one at a time. Servo control cable 86 is connected on one end to the fixed top plenum clamping plate 52a at position 86a and is connected at the other end to rotatable annular ring 82 at position 86b such that signals and power can be brought to and from servo positioner 80.

Figure 7:
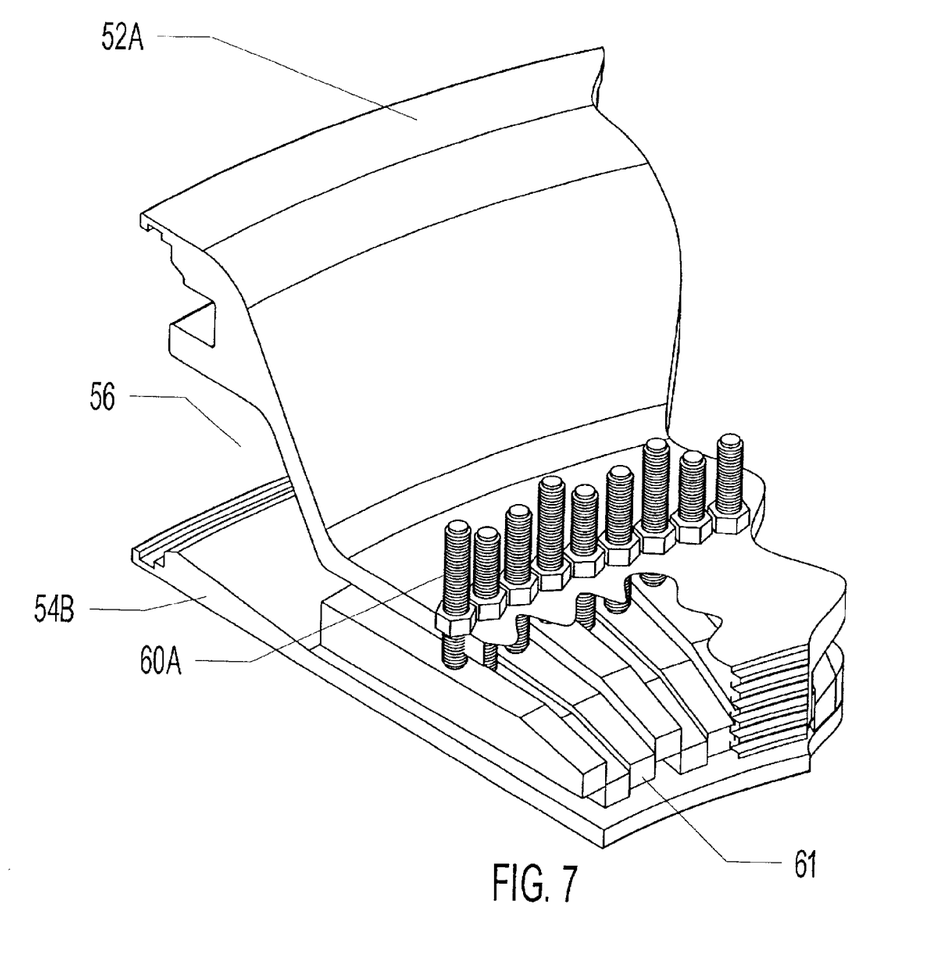
FIG. 7 is a partially cut away perspective view of an actuator section of the manual thickness profiler according to another embodiment of the present invention.

FIG. 7 is a view similar to FIG. 4 but showing an alternative embodiment. Unlike FIG. 4 which shows radial channels with sidewalls that prevent side-to-side mixing from one channel to the next, FIG. 7 is for an embodiment in which there are no such radial channels but rather a continuous annular region. In this embodiment, bolts 60A extend through nuts and through a top wall and are rigidly connected to elongated and radially oriented blocks 61. Block 61 effectively controls the top wall of the annular region and thus can be used to allow or restrict air flow in a controllable manner. If the pressure drop is sufficiently large across the blocks even when fully open, the side-to-side mixing and churning effects at the inner end of the annular region will be sufficiently small such that the operator can achieve the desired control over the cooling air on the bubble. The system of FIG. 7 can be made automatic in a manner similar to that shown in FIG. 6.

The present invention has been described in connection with certain structural embodiments and it will be understood that various modifications (such as individual automatic actuators) can be made to the above-described embodiments without departing from the spirit and scope of the invention as defined in the appended claims. While a dual lip air ring has been shown, the system and method could be used with a single lip arrangement.

What is claimed is:

1. A thickness control system for controlling the thickness of a blown film by providing air to the blown film when in liquid form and provided from an extrusion die, the system comprising:

an inlet for receiving air;

lips for providing air to an external surface of the blown film as the blown film exits the die, the lips arranged to be around the blown film as the blown film exits the die;

an annular region through which air is directed inwardly from the inlet to the lips such that all the air provided into the region is passed through to the lips; and a plurality of barriers movable along a direction perpendicular to the annular region for altering the flow of air through the annular region.

2. The system of claim 1, further comprising a sensor for sensing thickness of the blown film after the film solidifies, and a mechanical mover for moving the barriers in response to measurements from the sensor.

3. The system of claim 2, wherein the barriers are pistons, and the mover includes a servo-controlled motor for moving circumferentially around the blown film, the mover selectively adjusting the pistons.

4. The system of claim 1, wherein the annular region includes walls that define a plurality of radially oriented channels.

5. The system of claim 4, wherein each of the barriers is threaded and manually rotatable to allow more or less air flow.

6. The system of claim 4, wherein the radially oriented channels are defined by a top wall, a bottom wall, and side walls, the barrier being mounted in the top wall.

7. The system of claim 1, wherein the system has one and only one set of lips for providing air to the external surface of the blown film as the film exits the extrusion die.

8. The system of claim 1, wherein the system has two and only two sets of lips for providing air to the external surface of the blown film as the film exits the extrusion die.

9. The system of claim 4, wherein the barrier is located and configured such that a pressure drop within the radial channel across the barrier is at least 50% of the pressure drop across the lips.

10. The system of claim 4, wherein the barrier is located and configured such that a pressure drop within the radial channel across the barrier is at least 100% of the pressure drop across the lips.

11. The thickness control system of claim 1, wherein the annular region does not have separately walled radially oriented channels, and the barriers include
   elongated radially oriented blocks movable for controlling a cross section of air flow through the annular region.

12. The system of claim 11, further comprising a sensor for sensing thickness of the blown film after the film solidifies, and a mechanical mover for moving the barriers in response to measurements from the sensor.

13. The system of claim 11, wherein the each of the barriers has a threaded rod that can be turned manually to move the elongated block.

14. The system of claim 13, wherein the radially oriented blocks are defined by a top wall, a bottom wall, and side walls, the threaded rod being mounted to the top wall.

15. The system of claim 11, wherein the system has one and only one set of lips for providing air to the external surface of the blown film as the film exits the extrusion die.

16. The system of claim 11, wherein the system has two and only two sets of lips for providing air to the external surface of the blown film as the film exits the extrusion die.

17. The system of claim 1, wherein the barrier is located and configured such that a pressure drop within the annular region across the barrier is at least 50% of the pressure drop across the lips.

18. The system of claim 1, wherein the barrier is located and configured such that a pressure drop within the annular region across the barrier is at least 100% of the pressure drop across the lips.

19. A thickness control system for controlling the thickness of a blown film by providing air to the blown film when in liquid form and provided from an extrusion die, the system comprising:
   an inlet for receiving air;
   lips for providing air to an external surface of the blown film as the blown film exits the die, the lips arranged to be around the blown film as the blown film exits the die;
   an annular region for providing air inwardly from the inlet to the lips;
   a plurality of pistons movable within the annular region to alter the flow of air through the annular region; and
   a mover for moving circumferentially around the blown film to selectively adjust the pistons.

20. The system of claim 19, wherein the mover includes a servo-controlled motor.

21. The system of claim 19, wherein the pistons are in radially oriented channels defined by radially oriented walls.

22. The system of claim 19, wherein all the air provided into the region is passed through to the lips.

23. A thickness control system for controlling the thickness of a blown film by providing air to the blown film when in liquid form and provided from an extrusion die, the system comprising:
   an inlet for receiving air;
   lips for providing air to an external surface of the blown film as the blown film exits the die, the lips arranged to be around the blown film as the blown film exits the die;
   an annular region for providing air inwardly from the inlet to the lips; and
   a plurality of threaded barriers that extend into the annular region and that are manually rotatable for altering the flow of air through the annular region.

24. The system of claim 23, wherein the threaded barriers are in radially oriented channels defined by radially oriented side walls.

25. The system of claim 23, wherein all the air provided into the region is passed through to the lips.

26. The system of claim 23, wherein the threaded barriers extend into radially oriented channels defined by radially oriented walls in the annular region.

27. The system of claim 1, wherein the annular region is continuous and not divided into walled channels and the barriers abut each other.

* * * * *